United States Patent
Hecker et al.

(10) Patent No.: US 7,188,914 B1
(45) Date of Patent: Mar. 13, 2007

(54) METHOD FOR OPERATING A POWER-ASSIST BRAKING SYSTEM

(75) Inventors: Oliver Hecker, Babenhausen (DE); Steffen Ritz, Kirchheim (DE)

(73) Assignee: Continental Teves, AG and Company oHG, Frankfurt (DE)

( * ) Notice: Subject to any disclaimer, the term of this patent is extended or adjusted under 35 U.S.C. 154(b) by 1133 days.

(21) Appl. No.: 09/530,156

(22) PCT Filed: Aug. 25, 1999

(86) PCT No.: PCT/EP99/06236

§ 371 (c)(1), (2), (4) Date: Aug. 31, 2000

(87) PCT Pub. No.: WO00/10852

PCT Pub. Date: Mar. 2, 2000

(30) Foreign Application Priority Data

Aug. 25, 1998 (DE) .................. 198 38 618

(51) Int. Cl.
*B60T 8/66* (2006.01)
(52) U.S. Cl. ................... 303/157; 303/DIG. 2
(58) Field of Classification Search ......... 303/DIG. 1, 303/155, 157, DIG. 2
See application file for complete search history.

(56) References Cited

U.S. PATENT DOCUMENTS

| | | | | |
|---|---|---|---|---|
| 4,798,422 A | * | 1/1989 | Becker | .................. 303/115.4 |
| 5,158,343 A | * | 10/1992 | Reichelt et al. | ......... 303/113 SS |
| 5,727,852 A | * | 3/1998 | Pueschel et al. | ......... 303/113.4 |
| 6,027,182 A | * | 2/2000 | Nakanishi et al. | ....... 303/116.1 |
| 6,129,423 A | * | 10/2000 | Hashimoto | .................. 303/125 |
| 6,170,924 B1 | * | 1/2001 | Nakanishi et al. | .......... 303/155 |
| 6,199,963 B1 | * | 3/2001 | Shimizu | ..................... 303/155 |
| 6,226,586 B1 | * | 5/2001 | Luckevich et al. | ........ 188/72.1 |
| 6,234,589 B1 | * | 5/2001 | Yoshida | ..................... 303/157 |

FOREIGN PATENT DOCUMENTS

| | | |
|---|---|---|
| DE | 40 28 290 | 1/1992 |
| DE | 43 38 067 | 3/1995 |
| DE | 19501760 A1 * | 7/1996 |
| JP | 09 058454 | 3/1997 |
| JP | 10 181575 | 7/1998 |

* cited by examiner

*Primary Examiner*—Melody M. Burch

(57) ABSTRACT

In a method of operating a brake assistant system which includes a first mode of operation in which the brake assistant system is not operated, a second mode of operation in which, after recognition of an emergency brake situation, a pressure build-up of wheel brakes is generated, and a third mode of operation which is provided for the transition from the second into the first mode of operation, wherein in the third mode of operation the wheel brake pressure ($p_{WHEEL}$) is excessively elevated compared to the tandem master cylinder pressure ($p_{TMC}$) in a controlled way, a particularly safe and user-friendly termination of the brake assistant system results from diminishing the amount of the excess elevation over the course of time.

5 Claims, 2 Drawing Sheets

METHOD FOR OPERATING A POWER-ASSIST BRAKING SYSTEM

TECHNICAL FIELD

The present invention generally relates to vehicle brake systems and more particularly relates to a method of operating a brake assistant system.

BACKGROUND OF THE INVENTION

In order to realize a shortest possible stopping distance of automobiles in emergency brake situations, it is necessary to excessively raise the brake pressure with respect to a pedal force initiated by the driver. Since studies have yielded the result that, in emergency brake situations, normal drivers often cannot or only with a delay induce the required pre-pressure, so-called "brake assistant systems" were developed which raise the brake pressure automatically above the level pre-determined by the driver.

In principle, there are three known systems. In a first one, the brake pressure is raised by means of an automatic control of the brake booster. In the second one, the active pressure raise occurs through suitable control of the ABS/ESP hydraulics by means of the electric return pump. Further, there are other known brake assistant systems which all will be further developed. Just for example, it is referred to mechanical or electrical/mechanical brake assistants.

A method to shorten the stopping distance in critical driving situations has been disclosed in the German Patent DE 40 28 290 C1. In the method disclosed in this document, the excess of a first threshold value by the actuation speed of the brake pedal initiated by the driver is the criterion for the release of an automatic brake event, where, immediately after the release of the automatic brake event, such a brake pressure is automatically built up which corresponds to the value of the brake pressure at optimum vehicle deceleration. In order to ensure that the excessively raised brake pressure is reduced when the necessity of an automatic brake event is eliminated, it is verified, according to the teaching of this document, whether the actuation force of the brake pedal is smaller than a pre-set threshold value, i.e. whether the vehicle driver wants to reduce the power of the brake event and thus only a brake event with a lower brake force is necessary.

A mode of operation is provided which provides for the transition from a full pressure build-up of the actual brake assistant to a conventional brake behavior in order to avoid an abrupt termination of the support provided by the brake assistant which, immediately upon termination of the brake assistant, could have the result that a relatively low tandem master cylinder pressure coincides with a relatively high locking pressure.

Therefore, the objective of the present invention consists in avoiding the disadvantages of the prior art and in indicating a method of operating a brake assistant which avoids an abrupt termination of the brake support and which, at the same time, is particularly safe and user-friendly.

This objective is achieved in a method of the kind mentioned above by means of the present invention. Here, excess elevation is not understood as being the, regarding its absolute value, higher wheel cylinder pressure raised by the brake assistant with respect to the tandem master cylinder pressure, but it is rather the relative amount of this excess elevation with respect to the pressure in the tandem master cylinder.

A special advantage of the invention consists in that a once-initiated transition to conventional braking behavior is not being maintained for a longer time period. Otherwise, this would, e.g. while going downhill, result in an undesired and unsafe state of operation.

Preferably, the excess elevation is dependent on the driving situation and/or the input of a vehicle driver my means of the brake pedal. Thus, the brake force support can be tuned to the driving conditions in the best possible way. Also, in this case, a harmonic correlation can be ensured between the driver's directive and the pressure raise.

Preferably, the rate at which the excess elevation is reduced increases with the time duration and/or the intensity of a reduction of pedal force induced by the vehicle driver. A reduction of pedal force indicates a driver's intention that a brake operation is not necessary or not necessary as forceful any more. The input control by the driver can be used in an advantageous way to design the transition of the brake assistant function to the conventional brake operation.

A particularly simple and cost-effective realization of the invention results from using a counting device to recognize whether and/or by what amount the driver reduces the pedal force.

In order to implement the invention, it is preferred if the momentary value of the wheel brake pressure results substantially from a multiplication of a current value of a time-dependent excess elevation function and the current value of the tandem master cylinder pressure.

And the excess elevation function, as a function of time, is monotonously descending.

Preferably, the excess elevation function descends in time segments in which the master cylinder pressure descends. Further, the excess elevation function is constant in time segments in which the tandem master cylinder pressure increases. Thus, every diminution of the induced brake force effects a reduction of the excess elevation, and every other input via the brake pedal affects the wheel brake pressure but not the excess elevation. In this way, the brake assistant support can be diminished unnoticeably for the driver.

According to a preferred enhancement of the invention, a momentary value of the excess elevation function depends on the previous course of the tandem master cylinder pressure. The consideration of the history of the tandem master cylinder pressure is particularly preferred for the estimate of the driving situation and of the driver's intention. Advantageously, the excess elevation function includes a pre-set maximum value. In this way, implausible excess elevations of the wheel brake pressure can be avoided.

The brake assistant system preferably changes over from the third mode of operation to the first mode of operation when the excess elevation function substantially occupies the value "1". In this case, the driver himself affords the required locking pressure and does not need any further support.

DETAILED DESCRIPTION OF THE PREFERRED EMBODIMENTS

Figure 3:
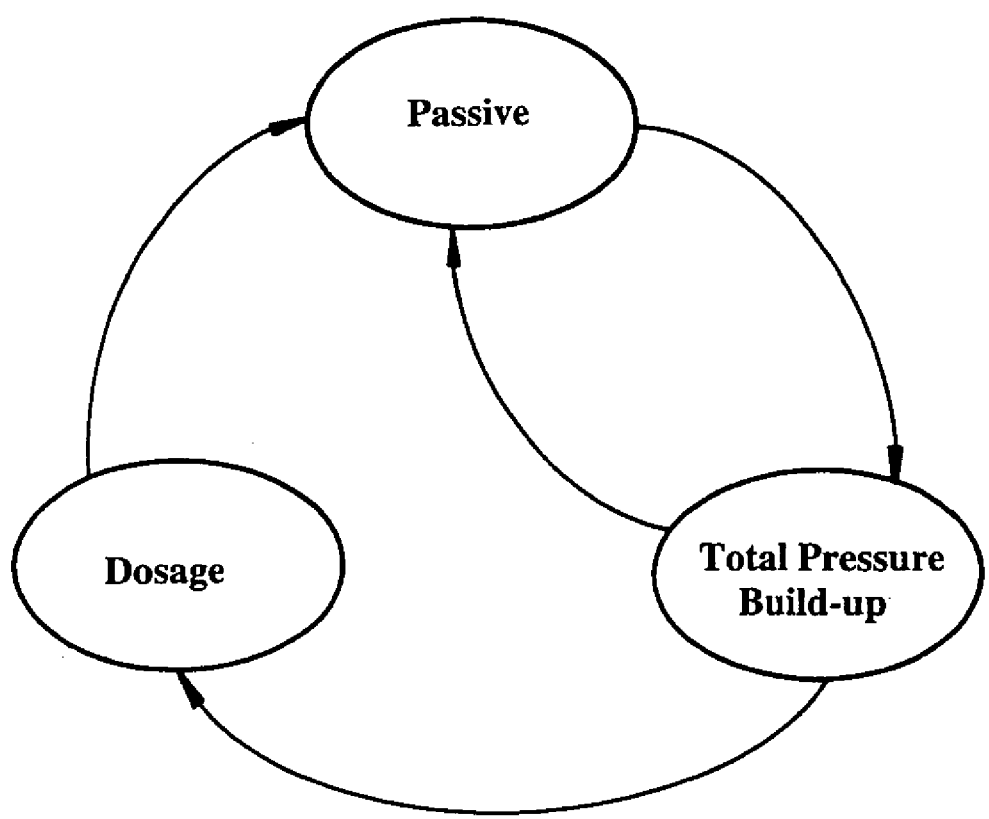
FIG. 3 shows a schematic depiction of the three modes of operation of the brake assistant system according to the invention and of the transitions between the respective states.

In FIG. 3, three kinds or modes of operation of the brake assistant system according to the invention are schematically depicted. From FIG. 3 can be obtained the function of the brake assistant system as an automaton of states. The first state or mode of operation "Passive" means that the brake assistant function is not active. As soon as an emergency braking situation is recognized, the system changes over into the second state or mode of operation "Total Pressure Build-up". In this state, a total pressure build-up is generated by means of a return pump and suitable control of separating and switch-over valves. From the state "Total Pressure Build-up", a change can be made as well into the state of passivity into the third mode of operation, the dosage mode if the pedal force is significant reduced which can be detected e.g. through the pressure sensor device arranged in the tandem master cylinder. Higher-ranking criteria for the activation of the state "Dosage" out of the state "Total Pressure Build-up" are the recognition of a driver's intention of a dosed diminution of the brake force. This is sensed in case of a significant diminution of the tandem master cylinder pressure $p_{TMC}$ after reaching the global locking-pressure level. A significant diminution of the tandem master cylinder pressure prior to reaching the global locking-pressure results in the direct transition from the state "Total Pressure Build-up" into the state "Dosage". In the state "Dosage", the brake force is modulated in dependence on the pedal force. After termination of the maximum actuation, the pressure build-up is gradually diminished or even increased again, in dependence on the driver's intention sensed by means of the measured tandem master cylinder pressure, in order to achieve in this way a comfortable transition between the maximum support during the emergency brake situation and the conventional brake behavior of the "Passive" mode after termination of the emergency brake support. This state resembles a brake-by-wire mode and can be called modulating.

Figure 1:
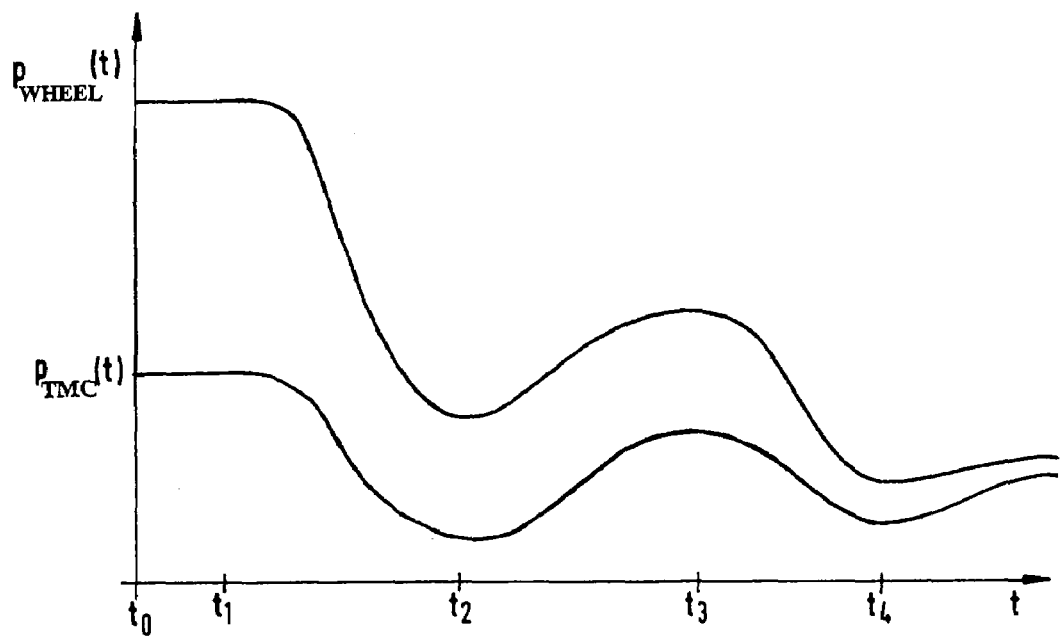
FIG. 1 shows a schematic depiction of the course of the time-dependent tandem master cylinder pressure $p_{TMC}(t)$.

In FIG. 1, a possible pressure course $p_{TMC}(t)$ of the tandem master cylinder pressure, substantially after the state "Total Pressure Build-up", is schematically depicted. The tandem master cylinder pressure $p_{TMC}(t)$ is, due to the actuation of the brake assistant function, significantly smaller than the wheel brake pressure (not depicted). The possible pressure course $p_{TMC}(t)$ schematically depicted in FIG. 1 is the result of an input by the driver by means of actuation of a brake pedal. In FIG. 1 can be seen that the tandem master cylinder pressure $p_{TMC}(t)$ is substantially constant between a point in time $t_0$ and $t_1$. This means that $p_{TMC}'(t)=0$ in the interval from $t_0$ to $t_1$. Between the point in time $t_1$ and a point in time $t_2$, the tandem master cylinder pressure decreases continuously. At the point in time $t_2$, the tandem master cylinder pressure $p_{TMC}(t)$ reaches a minimum value $p_{TMC}(t_2)$. Between the point in time $t_2$ and a point in time $t_3$, the tandem master cylinder pressure $p_{TMC}(t)$ increases continuously. At the point in time $t_3$, the master cylinder pressure has a maximum value $p_{TMC}\ t_3$. Between the point in time $t_3$ and a point in time $t_4$, the master cylinder pressure decays continuously. At the point in time $t_4$, the tandem master cylinder pressure $p_{TMC}(t)$ has a minimum value $p_{TMC}(t_4)$. In this example, the master cylinder pressure rises anew as of the point in time $t_4$.

Figure 2:
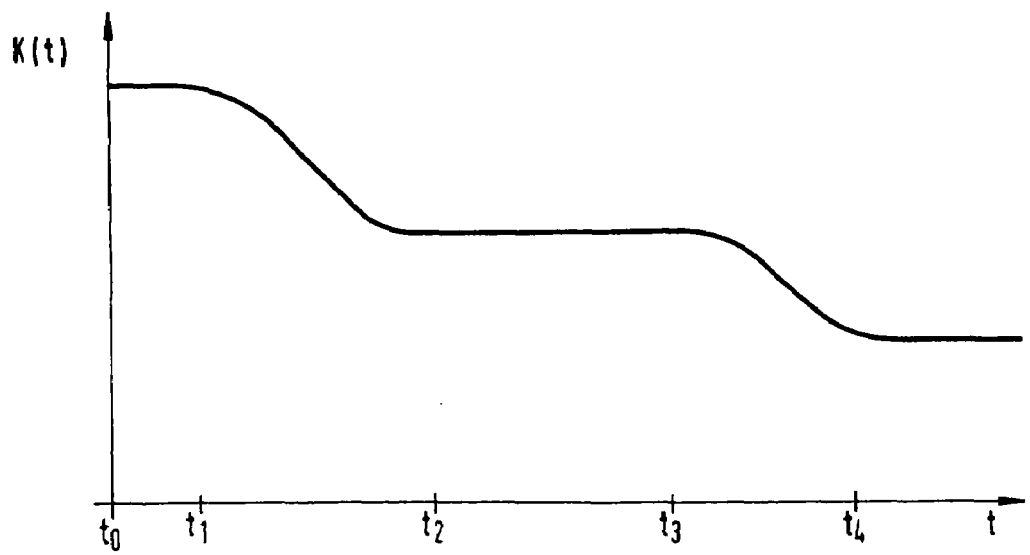
FIG. 2 shows a schematic depiction of a time-dependent excess elevation function $K(t)$ in order to illustrate an embodiment of the present invention.

According to the present invention, the excess elevation of the brake force caused by the automatic brake assistant shall be successively diminished. A diminution according to a simple time-dependent function, however, yields the disadvantage that the behavior of the system goes beyond the driver's understanding. This is the case, for instance, when the brake effect fades despite keeping the pedal force constant. According to the invention, the vehicle deceleration or the wheel brake pressure $p_{WHEEL}(t)$, respectively, are controlled dependent on a measured tandem master cylinder pressure $p_{TMC}(t)$ during the dosage phase. A sample course of $p_{TMC}(t)$ was described above in connection with FIG. 1. A possible functional correlation for controlling the wheel brake pressures $p_{WHEEL}(t)$ is: $p_{WHEEL}(t)=K(t)*p_{TMC}(t)$. This functional correlation is just given as an example and serves in particular also to define the excess elevation function $K(t)$ inasfar as estimated values or currently measured values, respectively, are used. It is noted that, in particular also in the above equation, an offset can be considered, i.e. in particular of the kind=$K(t)*$. If the value or x, for example, amounts to 6, the third mode of operation can be exited into the passive mode when the tandem master cylinder pressure falls below a minimum pressure of 6 bar. The course of the time-dependent excess elevation function $K(t)$, which can also be called amplification factor, is, according to a variant of the present invention, schematically depicted in FIG. 2. From FIG. 2, it can be gathered that $K(t)$ has a monotonously declining course. The value of $K(t)$ ranges between a substantially maximum starting value for the dosage mode which is substantially determined according to the proportion between an estimated locking-pressure level and the current tandem master cylinder. In principle, a maximum value for $K(t)$ is pre-set, e.g. 3.5, in order to avoid implausible wheel brake pressure excess elevations. During the entire dosage mode, the value of $K(t)$ is greater than 1, for otherwise no further brake support is required and the system changes into the passive mode. In the embodiment shown, the course of $K(t)$ is not strictly monotonous, for there are times when $K'(t)$ equals 0. Substantially, the rule is that, in phases in which the tandem master cylinder pressure $p_{TMC}(t)$ is constant or rises, that means in phases in which $p_{TMC}'(t)$ is greater than or equal to 0, $K(t)$ is constant. Substantially in phases in which $p_{TMC}(t)$ declines, i.e. when $p_{TMC}'(t)$ is smaller than 0, $K(t)$ declines as well, i.e. $K'(t)<0$. In FIG. 2 can be seen that, in the interval from $t_0$ to $t_1$, $K(t)$ is substantially constant. In the interval from $t_1$ to $t_2$, $K(t)$ declines substantially monotonously to a value $K(t_2)$. In the interval from $t_2$ to $t_3$, $K(t)$ is substantially constant. In the interval from $t_3$ to $t_4$, $K(t)$ declines substantially monotonously. As of the point in time $t_4$, $K(t)$ is constant for all $t>t_4$. Therefore, the course of $K(t)$ is substantially a sequence of declining plateaus corresponding to the oscillations of the tandem master cylinder pressure $p_{TMC}(t)$. The plateaus themselves are substantially characterized by phases of rising tandem master cylinder pressure $p_{TMC}(t)$. The plateaus, which, with time increasing, have declining values, are connected by monotonously declining line segments which substantially correspond to phases of declining tandem master cylinder pressure $p_{TMC}(t)$. It is noted that, according to the depicted and described embodiment of the invention, the brake assistant support is diminished practically undetectably by the driver. Advantageously, the rate at which the support of the hydraulic brake assistant is diminished, i.e. in particular the derivative $K'(t)$, increases according to its absolute value the longer and the more distinctly the driver diminishes the pedal force. This means graphically, particularly in the embodiment, that, if the interval, e.g. between $t_1$ and $t_2$ increased, i.e. if the driver diminished the pedal force over a longer time interval, the inclination of $K(t)$ would increase. Accordingly, the same is true if the diminution of pedal force, i.e., for instance, the value of $p_{TMC}(t_2)$ minus $p_{TMC}(t_3)$ increased.

The invention claimed is:

1. A method of operating a brake assistant system which comprises a first mode of operation in which the brake assistant system is not actuated, a second mode of operation in which after recognition of an emergency brake situation a pressure build-up of wheel brakes is generated, and a third mode of operation which is provided for the transition from the second into the first mode of operation, comprising the steps of:

monitoring the master cylinder pressure in the third mode of operation, determining when the wheel brake pressure is excessively elevated compared to the monitored master cylinder pressure, and diminishing the amount of excess elevation by functionally correlating the wheel brake pressure with the monitored master cylinder pressure throughout the duration of the third mode of operation, wherein the diminishing step further includes determining a momentary value of the wheel brake pressure by multiplying a momentary value of a time-dependent excess elevation function with a momentary value of the master cylinder pressure throughout the duration of the third mode of operation and wherein said controlling step further includes keeping the excess elevation function constant in time intervals in which the master cylinder pressure is increasing.

2. The method according to claim 1, wherein the excess elevation is a function of a driving situation and/or an input of a vehicle driver via a brake pedal.

3. The method according to claim 1, wherein the momentary value of the excess elevation function is a function of a previous course of the master cylinder pressure.

4. The method according to claim 1, further including the step of presetting a maximum value for the excess elevation function.

5. The method according to claim 1, further including the step of changing the brake assistant system from the third mode of operation into the first mode of operation when the excess elevation function substantially has a value equal to 1.

* * * * *